US010054234B2

(12) United States Patent
Jones et al.

(10) Patent No.: US 10,054,234 B2
(45) Date of Patent: Aug. 21, 2018

(54) ONE-WAY VALVE

(75) Inventors: Anthony Jones, Oxford (GB);
Jonathan Upsdell, Oxford (GB)

(73) Assignee: Oxford Nanopore Technologies Limited, Oxford (GB)

( * ) Notice: Subject to any disclaimer, the term of this patent is extended or adjusted under 35 U.S.C. 154(b) by 0 days.

(21) Appl. No.: 14/232,477

(22) PCT Filed: Jul. 11, 2012

(86) PCT No.: PCT/GB2012/051641
§ 371 (c)(1),
(2), (4) Date: Mar. 27, 2014

(87) PCT Pub. No.: WO2013/008010
PCT Pub. Date: Jan. 17, 2013

(65) Prior Publication Data
US 2014/0238497 A1  Aug. 28, 2014

(30) Foreign Application Priority Data

Jul. 13, 2011 (GB) .................................. 1112049.0

(51) Int. Cl.
*F16K 7/17* (2006.01)
*F16K 25/00* (2006.01)
*F16K 15/14* (2006.01)

(52) U.S. Cl.
CPC .............. *F16K 7/17* (2013.01); *F16K 15/144* (2013.01); *F16K 25/00* (2013.01); *Y10T 137/0318* (2015.04); *Y10T 137/7895* (2015.04)

(58) Field of Classification Search
CPC .......... F16K 15/144; F16K 25/00; F16K 7/17; Y10T 137/7895
See application file for complete search history.

(56) References Cited

U.S. PATENT DOCUMENTS 2,461,211 A    2/1949  Guthrie
3,270,771 A *  9/1966  Morgan ................ F16K 15/144
                                                    137/859
(Continued)

FOREIGN PATENT DOCUMENTS

CH         344883       2/1960
CN      101224320 A     7/2008
(Continued)

OTHER PUBLICATIONS

Great Britain Search Report for Application No. GB1112049.0, 2 pages, dated Jul. 26, 2011.
(Continued)

*Primary Examiner* — Michael R Reid
*Assistant Examiner* — Patrick Williams
(74) *Attorney, Agent, or Firm* — Wolf, Greenfield & Sacks, P.C.

(57) ABSTRACT

A one-way valve, comprises a valve housing; a valve member provided within the valve housing, the valve member being operative to open and close the valve and comprising a diaphragm with a central orifice to allow fluid to pass from one side of the diaphragm to the other; a valve inlet provided on a first side of the diaphragm; and a valve outlet provided on a second side of the diaphragm; wherein the configuration of the diaphragm and the valve housing biases the diaphragm to seal the inlet at rest.

21 Claims, 11 Drawing Sheets

(56) References Cited

U.S. PATENT DOCUMENTS

| | | | |
|---|---|---|---|
| 3,422,848 A | | 1/1969 | Liebman et al. |
| 3,799,411 A | | 3/1974 | Carpenter |
| 4,712,583 A | | 12/1987 | Pelmulder et al. |
| 5,496,009 A | * | 3/1996 | Farrell et al. ............... 251/61.1 |
| 5,529,280 A | * | 6/1996 | Satoh ............... F16K 31/1266 251/331 |
| 5,771,935 A | * | 6/1998 | Myers ........................ 137/859 |
| 5,800,405 A | | 9/1998 | McPhee |
| 5,902,276 A | | 5/1999 | Namey |
| 6,004,300 A | | 12/1999 | Butcher et al. |
| 6,067,864 A | | 5/2000 | Peterson |
| 6,090,081 A | | 7/2000 | Sudo et al. |
| 6,254,057 B1 | * | 7/2001 | Pubben ................. F16K 7/17 137/625.25 |
| 6,537,451 B1 | | 3/2003 | Hotier |
| 6,565,535 B2 | | 5/2003 | Zaias et al. |
| 7,360,556 B2 | * | 4/2008 | Mijers ....................... 137/493.9 |
| 7,537,437 B2 | | 5/2009 | Muramatsu et al. |
| 7,682,356 B2 | | 3/2010 | Alessi et al. |
| 7,766,028 B2 | | 8/2010 | Massengale et al. |
| 8,123,756 B2 | | 2/2012 | Miller et al. |
| 8,162,006 B2 | | 4/2012 | Guala |
| 8,312,805 B1 | | 11/2012 | Blume |
| 9,194,504 B2 | | 11/2015 | Cormier et al. |
| 9,551,338 B2 | | 1/2017 | Jones et al. |
| 9,593,370 B2 | | 3/2017 | Jones |
| 2001/0035516 A1 | | 11/2001 | Nichols et al. |
| 2002/0007139 A1 | | 1/2002 | Zaias et al. |
| 2003/0116206 A1 | | 6/2003 | Hartshorne et al. |
| 2005/0227239 A1 | | 10/2005 | Joyce |
| 2006/0069356 A1 | | 3/2006 | Witowski |
| 2006/0105461 A1 | | 5/2006 | Tom-Moy et al. |
| 2006/0210995 A1 | | 9/2006 | Joyce |
| 2007/0163656 A1 | | 7/2007 | Mijers |
| 2007/0202008 A1 | | 8/2007 | Schembri et al. |
| 2007/0219508 A1 | | 9/2007 | Bisegna et al. |
| 2008/0003147 A1 | | 1/2008 | Miller et al. |
| 2008/0032290 A1 | | 2/2008 | Young |
| 2009/0311117 A1 | | 12/2009 | Gustafsson |
| 2010/0062446 A1 | | 3/2010 | Hanafusa |
| 2010/0070069 A1 | | 3/2010 | Hofstadier et al. |
| 2010/0113762 A1 | | 5/2010 | Ball et al. |
| 2010/0148126 A1 | | 6/2010 | Guan et al. |
| 2011/0108147 A1 | | 5/2011 | Carmody et al. |
| 2012/0322679 A1 | | 12/2012 | Brown et al. |
| 2013/0203634 A1 | | 8/2013 | Jovanovich et al. |
| 2013/0217106 A1 | | 8/2013 | Jones |
| 2014/0314594 A1 | | 10/2014 | Jones et al. |
| 2014/0377108 A1 | | 12/2014 | Jones et al. |
| 2015/0031020 A1 | | 1/2015 | Jayasinghe et al. |

FOREIGN PATENT DOCUMENTS

| | | |
|---|---|---|
| CN | 201152237 | 11/2008 |
| DE | 202004009831 U1 | 9/2004 |
| DE | 102006026220 B4 | 12/2007 |
| DE | 202007012680 U1 | 2/2008 |
| DE | 102009006203 A1 | 4/2010 |
| EP | 0086073 | 8/1983 |
| EP | 0247824 A2 | 12/1987 |
| EP | 0925798 B1 | 6/1999 |
| EP | 0934757 A2 | 8/1999 |
| EP | 1197693 | 4/2002 |
| EP | 1351183 A2 | 10/2003 |
| EP | 1544310 A2 | 6/2005 |
| EP | 1640168 A2 | 3/2006 |
| EP | 1946793 A1 | 7/2008 |
| EP | 2163273 B1 | 3/2010 |
| EP | 2165723 A1 | 3/2010 |
| FR | 2947873 A1 | 1/2011 |
| GB | 840499 | 7/1960 |
| GB | 896056 | 5/1962 |
| GB | 2443260 | 4/2008 |
| GB | 2447043 | 9/2008 |
| GB | 2474073 | 4/2011 |
| JP | 06-319801 | 11/1994 |
| JP | 2003-235974 | 8/2003 |
| JP | 2003-328420 | 11/2003 |
| WO | WO 1981/001445 | 5/1981 |
| WO | 03/017020 A1 | 2/2003 |
| WO | WO 2005/005829 A1 | 1/2005 |
| WO | WO 2005/017356 A1 | 2/2005 |
| WO | WO 2005/124888 | 12/2005 |
| WO | WO 2007/054233 | 5/2007 |
| WO | WO 2007/102836 A1 | 9/2007 |
| WO | WO 2007/141058 A1 | 12/2007 |
| WO | 2008/008974 A2 | 1/2008 |
| WO | WO 2008/111863 | 9/2008 |
| WO | WO 2009/020682 A2 | 2/2009 |
| WO | WO 2009/077734 A2 | 6/2009 |
| WO | WO 2010/083147 | 7/2010 |
| WO | WO 2011/067559 | 6/2011 |
| WO | 2012/042226 A2 | 4/2012 |

OTHER PUBLICATIONS

International Search Report and Written Opinion for Application No. PCT/GB2012/051641, 11 pages, dated Oct. 24, 2012.

Boresi et al., Advanced mechanics of materials. 6th edition. 2003. Chapter 13. 457-501.

* cited by examiner

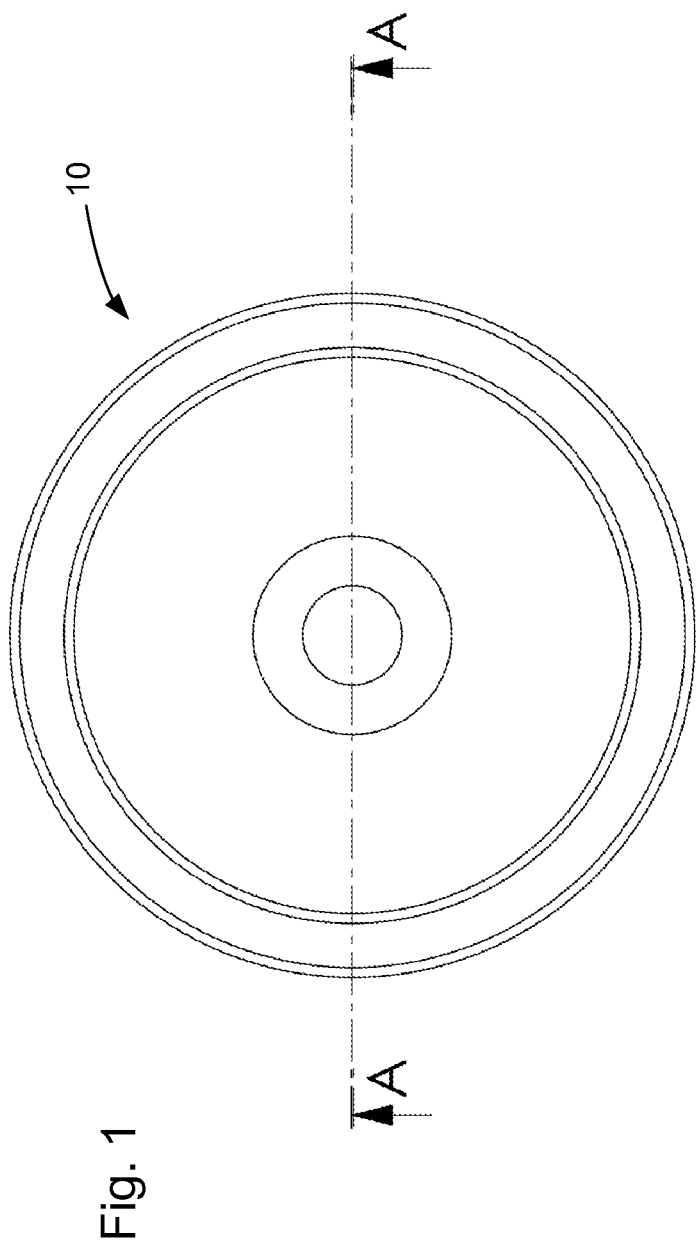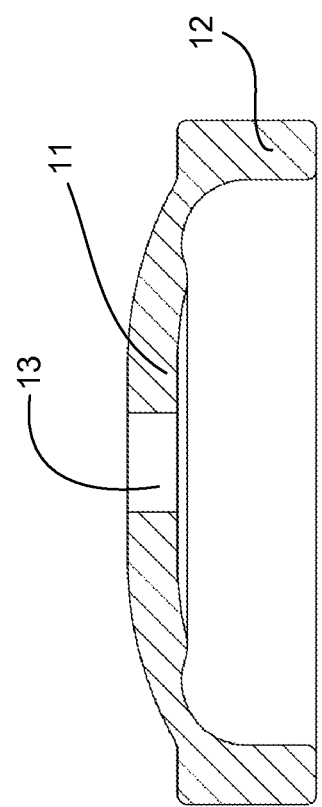
Fig. 1
Fig. 2

ONE-WAY VALVE

RELATED APPLICATIONS

This application is a 35 U.S.C. 371 national stage filing of International Application No. PCT/GB 2012/051641 filed Jul. 11, 2012, which claims priority to United Kingdom Application No. 1112049.0, filed Jul. 13, 2011. The contents of the aforementioned applications are incorporated herein by reference in their entirety.

The present invention relates to one-way valves, which allow flow through a valve chamber in one direction but do not allow flow through the valve chamber in the opposite direction.

Existing one-way valves utilise different sealing mechanisms to achieve the effect of only allowing flow in one direction. This effect is desirable, for example, to prevent backflow of fluid in a line and hence contamination of an upstream fluid with a downstream fluid. In other configurations, fluid lines may be designed to operate in both directions and a one-way valve may be used to isolate a branch of a fluid line when the flow occurs in a particular direction.

One existing type of one-way valve is a duckbill valve. This design of valve typically comprises a tube with one end that seals around an inlet and a second end that is flattened, and projects into the valve chamber or directly into the valve outlet. The tube is made of a non-porous elastomeric material. When fluid flows from the inlet through the valve, the fluid pressure opens the sealed flattened end of the tube and so the valve allows flow. However, when fluid attempts to flow in the other direction (i.e. from the outlet to the inlet), the elastic nature of the tube causes the tube to return to its flattened shape and a seal is created at the second end by the fluid pressure from the outlet side forcing the tube closed.

Another type of one-way valve is an umbrella valve. This design of valve typically comprises a valve member made of a non-porous elastomeric material. The valve member has the shape of an open parasol or 'umbrella'. The stem of the 'umbrella' is used to anchor the valve member in position on a supporting plate, so that (at rest) the canopy of the 'umbrella' forms a seal against the supporting plate. The valve inlet(s) are provided in the supporting plate, beneath the canopy of the valve member. The valve outlet is provided on the opposite side of the canopy. As such, when fluid flows from the inlet into the valve, the fluid pressure may deform the canopy to take a 'wider open' shape and so separate from the supporting plate, thereby allowing flow of fluid through the valve. However, when fluid attempts to flow from the outlet to the inlet, the elastic nature of the canopy causes the valve member to return to the 'at rest' position and seal against the supporting plate. Once again, the seal may be reinforced by fluid pressure on the outlet side forcing the canopy into the closed/at rest position.

Another type of one-way valve is a spring-loaded check valve. In this design the valve sealing mechanism typically comprises a ball bearing or other sealing member which fits within an elastomeric O-ring. The sealing member is biased against the O-ring by a spring. The valve inlet is provided on the opposite side of the O-ring to the spring, and the valve outlet is provided on the same side of the O-ring as the spring. As such, the pressure of the fluid from the inlet may act against the spring, forcing the sealing member back and allowing fluid to flow through the valve between the sealing member and the O-ring. In contrast, when fluid attempts to flow from the outlet to the inlet, the spring forces the sealing member against the O-ring in the same direction as the force exerted by the fluid pressure, and so the seal remains closed. In some variations, the force exerted by the spring may be controlled by a user, by changing the amount of compression in the spring.

Whilst the duckbill, umbrella and spring-loaded valves may provide a good seal in some situations, they are not always suitable for a particular application. For example, the spring-loaded valve may not be suitable for applications in which the spring material can react with the fluid flowing through the valve. Further all three valve types typically have a large height, to allow enough space for the 'duckbill' or 'stem' or spring. This can make them inappropriate for applications in which space is at a premium, such as lab-on-a-chip, fluidic manifolds, or microfluidic applications.

Flat check valves have been developed to have a small height. FIG. 13a shows a cross section through a flat check valve, having an elastomeric valve member 1 positioned within a valve chamber created by the valve housing parts 2 and 3. The valve is designed to allow flow from an inlet 4 to an outlet 5 through the centre of the valve member 1. The valve seals, when the fluid tries to flow from the outlet 5 to the inlet 4, by relying on the outlet pressure forcing the valve member 1 against a valve seat 7 formed on the housing. This closes the fluid path through from the outlet through the orifice to the inlet, and hence prevents flow. At rest, the valve member 1 is typically positioned close to the valve seat 7, or may rest in an undeformed state on the valve seat 7. That is, in FIG. 11a, the valve member 1 has its natural shape—it is not deformed by the surrounding housing. When fluid flows from the inlet through the valve, the valve member 1 may be deformed away from the valve seat so as to (further) open the valve and allow for fluid flow, as show in FIG. 13b.

However, flat check valves have been found to suffer from the problem that they provide lower quality seal than other types of check valves (such as those previously discussed). In particular, problems can be encountered with low viscosity fluids.

The present invention aims to provide an improved valve that at least partly overcomes some or all of the forgoing problems.

According to the invention, there is provided a one-way valve that may comprise a valve housing; a valve member provided within the valve housing, the valve member being operative to open and close the valve and comprising a diaphragm with a central orifice to allow fluid to pass from one side of the diaphragm to the other; a valve inlet provided on a first side of the diaphragm; and a valve outlet provided on a second side of the diaphragm; wherein the configuration of the diaphragm and the valve housing biases the diaphragm to seal the inlet at rest.

This valve is advantageous because it provides an active seal, preventing backflow, when the valve is at rest. This is advantageous in low velocity or low pressure systems, in which standard flat check valves do not provide a sufficient sealing force. This is because standard flat check valves rely on the backpressure driving flow in the wrong direction to close the valve. In contrast, the valve of the present invention does not rely on the backpressure to create a seal. This is particularly advantageous when fluid volumes and pressures are very low, for example in microfluidics systems and lab-on-a-chip applications. The provision of a diaphragm that is actively biased to close the valve means that, even when there are low pressures encouraging a backflow, the valve is firmly closed. Further, after the valve has been opened, and the flow subsequently ceases, the valve will actively return to the sealed state, as the diaphragm tries to return to its natural (unbiased) position.

The valve inlet can be annular or can comprise two or more openings, each radially offset from the diaphragm orifice. This spreads the fluid pressure from the inlet more evenly around the diaphragm and increases the area over which the pressure acts, which in turn allows for sufficient force to be applied by the inlet fluid to open the valve. This avoids the creation of an excessive break pressure in the valve to enable normal flow (i.e. from the inlet to the outlet), whilst maintaining the tight seal that prevents backflow.

The valve outlet can be provided coaxially with the diaphragm orifice. This allows a smooth flow to be developed when the valve is open, as the fluid can flow directly through the diaphragm orifice and then the outlet.

The housing can further comprise a valve seat, on the first side of the diaphragm, against which the diaphragm forms a seal at rest. The seat and the diaphragm cooperate to form a seal that prevents backflow through the valve. That is, the configuration of the diaphragm and housing together allow the formation of a seal between the diaphragm and the valve seat, around the orifice, which isolates the valve inlet from the valve outlet. As such, the valve seat biases the diaphragm to seal the inlet at rest.

The valve can further comprise a projection formed in relief on the valve seat, such that a sealing surface of the projection contacts the diaphragm at rest to form the seal. The projection concentrates the force acting to return the diaphragm to its natural shape (i.e. the shape it would have outside of the valve) due to the elasticity in the diaphragm (which is the same as the sealing force), and so causes the diaphragm to locally deform around the projection in the closed/at rest position. By 'at rest', it is meant that the diaphragm does not experience any hydrostatic forces within the valve—that is, there is no pressure differential across the diaphragm (the only forces acting are those present due to the arrangement of the diaphragm within the valve member). Alternatively, a projection may be formed on the diaphragm, with the sealing surface of the diaphragm contacting the valve seat in the rest position. Once again, the projection acts in the same way to concentrate the sealing force and create a tight seal. When the projection is formed on the diaphragm, a corresponding recess may be formed in the housing. Preferably, the recess has a narrower width than the width of the projection, so that the edges of the recess push into the substance of the projection and concentrate the sealing force.

At rest, the valve seat preferably causes local compression of the diaphragm on the first side of the diaphragm. This can be caused by the concentration of the sealing force, resulting in the valve seat pushing into the substance of the diaphragm and deforming the diaphragm around it, and compressing the material of the diaphragm in the region around the valve seat.

The projection can be formed in an annulus that surrounds the diaphragm orifice when the valve is closed. Preferably, the radial distance between the edge of the diaphragm orifice and the inner edge of the projection is less than or equal to twice the height of the projection, optionally less than or equal to once the height of the projection. This provides a continuous ring in which the diaphragm becomes locally deformed, ensuring a good seal all the way around the diaphragm orifice, whilst maintaining the seal close to the orifice, and thereby allowing plenty of diaphragm outside the projection that can be used to actuate the diaphragm from the inlet.

The sealing surface can be curved with a radius of curvature of 1 mm or less, preferably 0.1 mm or less, more preferably 0.05 mm or less. This provides a sharp point to the projection, which ensures that the projection burrows into the diaphragm as much as possible and creates a good seal.

The diaphragm can comprise or consist of silicone. Silicone is a preferable material to use in a fluidic/microfluidic environment because it is generally unreactive and so will not interact with any fluids passing through the valve. Further the material properties of silicone provide for a flexible material with sufficient rigidity to provide a good seal. The diaphragm can comprise or consist of a material with a hardness of 95 Shore A or less, optionally a hardness of 75 Shore A or less, further optionally 50 Shore A or less, and still further optionally of 40 Shore A or less. The material selection for the diaphragm affects the quality of the seal.

Preferably, the valve member has a rest height in isolation of 10 mm or less, optionally 5 mm or less and further optionally 2 mm or less. This allows for the provision of a valve in applications such as microfluidics and lab-on-a-chip, in which space and height considerations can be of critical importance.

A portion of the diaphragm around the orifice can be thicker than a portion of the diaphragm closer to the perimeter of the diaphragm. This allows for the diaphragm to maintain flexibility, and therefore a low break pressure, whilst also ensuring a good seal is produced to prevent backflow.

The perimeter of the diaphragm can be clamped within the valve housing, to ensure that there is no leakage around the diaphragm.

According to another aspect of the invention, there is provided a method of operating a valve, comprising: arranging a diaphragm with a central orifice in a valve housing, so that the configuration of the diaphragm and the housing biases the diaphragm to seal an inlet to the valve chamber; and creating a pressure differential across the valve chamber, so that the pressure at the inlet is greater than the pressure in the valve chamber and the diaphragm deforms to unseal the inlet.

The present invention will be described with reference to exemplary embodiments and the accompanying Figures in which:

FIG. 1 is a plan view of one-way valve member;

FIG. 2 is a cross-sectional view of the one-way valve member of FIG. 1 through the plane AA;

In the description below, like features in different figures are provided with like reference numerals.

Figure 3:
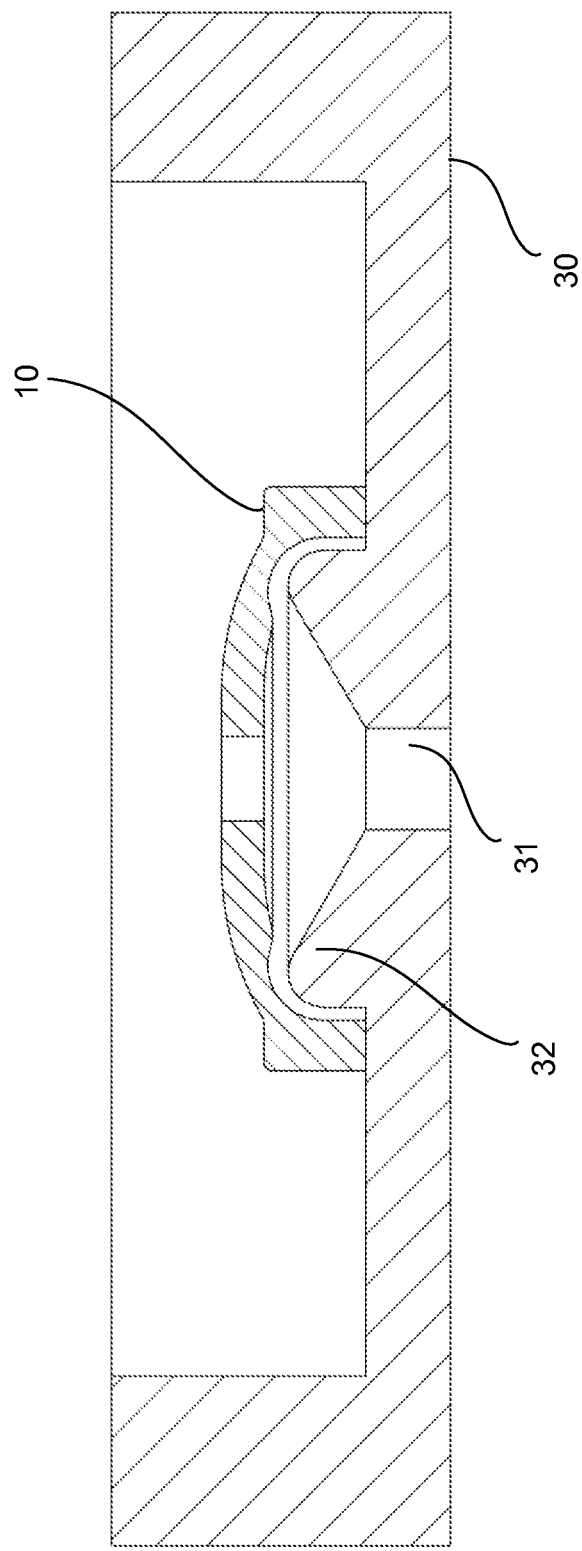
FIG. 3 is cross-section view of the one-way valve member of FIG. 1 arranged over a valve outlet.

The present invention has identified that existing valves are unsuitable for many microfluidic applications. For example, WO 2011067559, hereby incorporated by reference, discloses a biochemical analysis instrument that utilises nanopores deployed in a lipid bi-layer to, for example, sequence polynucleotides. This is an example of a 'nanopore application', referred to below. The formation of the bi-layer and the provision of the nanopores require careful control of the microfluidic environment.

For example, when fluids are pumped via a volumetric displacement, there is a risk of unknown amount of air being present within the system. This can be problematic, because the air is compressible and the required volumetric output of liquid is required to be accurate. If a valve requires a high break pressure to open, and air is present when pressure is applied to the system, the air will compress, changing the volume in the system and therefore changing the amount of liquid that is output by the system.

Further, when pumping fluid for a nanopore application, any introduction of bubbles can be damaging to the system. Applying negative pressure to the fluid can introduce bubbles within the liquid, whilst high positive pressures can cause the dissolution of air into the liquid that may cause later bubble formation when the pressure is released.

In the case of pumping lipid to form bi-layers, an extremely slow pumping speed is required. An example range is between 1 µl/s to 0.1 µl/s. Conventional passive check valves are often ineffective at these speeds, because they do not provide enough force to reliably seal the valve, and so backflow can occur.

Another consideration for nanopore applications is that the presence of metals in the system poses a risk of contamination and/or blocking of the nanopores. As such, using a spring-energised valve to provide active sealing force within a valve is at best undesirable because it increases the risk of metal contamination. This concern can be generalised to account for the fact that it would be undesirable for any of the valve materials to introduce unwanted contaminants.

Finally, the repeatability of the valve sealing and the break pressure is important, since consistent performance is desirable both for a single device and between one nanopore device and another. This is particularly relevant when considering the small volumes of liquids being displaced and the need to ensure that accurate amounts of a required fluid are provided at the correct time.

Of course, many of the above considerations are not limited to nanopore applications, and are generally applicable to other microfluidic environments.

As mentioned above, conventional flat check valves can encounter sealing problems when using low viscosity fluids. This is because, when a fluid flows through a small gap the resistance to that flow is directly proportional to the viscosity of the fluid flowing through the gap. The viscosity of air is approximately 18 µPa·s, the viscosity of water is approximately 0.89 mPa·s, and a typical viscosity for oil might be approximately 65 mPa·s. Therefore, it can be understood that there is approximately 3600 times more resistance to a flow of oil through a gap than a flow of air, and around 70 times more resistance to a flow of oil than a flow of water.

As a result, this means that it is much easier to create a seal against oil than against air or water. This is because it will require a higher pressure differential across the gap to cause the oil to flow, compared to the pressure differential required for air or water. However, when a large pressure differential is acting against a one-way valve (i.e. encouraging a back flow the wrong way through the valve) the pressure will also help seal the valve. In contrast, a low back pressure may not be enough to seal a valve, but may still provide sufficient driving force to cause air or water to flow.

FIGS. 1 and 2 show a one-way valve member 10. In use, within a valve chamber, the valve member is operative to open and close a valve. The one-way check valve member 10 comprises a diaphragm 11 connected at its perimeter to a supporting wall 12. In use, the check valve member 10 is positioned in a valve chamber (discussed further below). The check valve member 10 can be formed from a non-porous material, with an orifice 13. The check valve member 10 can be formed of a flexible elastomeric material such as rubber or another elastomer such as a thermoplastic elastomer, a thermoplastic polyurethane, a silicone or a polysiloxane based material. Medical grade, platinum cured, silicones, are preferable because they exhibit low toxicity and low plasticiser leaching, being unreactive and having a low aqueous solubility. This makes them attractive for use in fluidic and lab-on-a-chip applications. In general, for nanopore applications, materials with low reactivity, low chemical leaching and/or low lipid adsorption is preferred. Additionally, the use of silicones made to USP class VI would ensure a consistent quality of material and thus consistent mechanical performance of the valve members formed. Further preferably, silicones packaged within an ISO 14644 Class 6 (equivalent to US FED STD 209E Class 10,00) clean room, would further limit the risk of contamination to the overall fluidic/microfluidic system.

The importance of the USP class is not primarily the medical grade to which it relates, but rather consistency of material quality that it requires. This allows valve members with consistent mechanical properties to be created, without concerns that differing material quality will affect the valve performances. As such, any other suitable monitoring of valve material quality would be acceptable.

The check valve member 10 is shown as comprising a circular diaphragm 11, but the invention is not limited to this shape. For example, the check-valve member 10 may have a polygonal or freeform perimeter shape. As such, the shape may be chosen to fit the space and shape limitations of a particular application. However, a substantially circular perimeter and diaphragm 11 shape allows for the most even distribution of resistive force around the diaphragm 11, in use.

The diaphragm 11 has an orifice 13 provided substantially centrally in the diaphragm 11. That is, in the circular configuration of FIGS. 1 and 2 and for regular polygonal shaped valve members 10, the orifice lies on the axis of rotational symmetry passing through the diaphragm 11 (i.e. vertically through the orifice 13 in FIG. 2). For irregular shapes, the orifice 13 is preferably provided at the centroid of the perimeter shape. The central provision of the orifice 13 allows for the most even distribution of forces over the diaphragm during use. It also provides the maximum length between the orifice and the wall 12, providing maximum flexibility of the diaphragm 11 around the orifice 13, as discussed in more detail below. Preferably, the diaphragm contains only a single orifice 13, to simplify the sealing of the valve.

The diaphragm 11 in FIGS. 1 and 2 has a variable thickness across the width of the diaphragm. As can be seen in FIG. 2, the diaphragm 11 is relatively thick around the orifice 13 and the central area of the diaphragm 11. However, at the perimeter portion, towards the wall 12, the diaphragm 11 is relatively thin. Advantageously, this reduction in thickness as the diaphragm 11 approaches the perimeter allows the diaphragm 11 more flexibility, allowing (for a given fluid velocity or pressure) for a greater deflection of the diaphragm 11 when the valve opens.

Advantageously, the diaphragm 11 has a domed shape that is concave relative to the wall. As discussed below, in the embodiments described this domed shape contributes to the improved sealing of the valve. However, the invention is not limited to the use of this domed shaped diaphragm 11, and the invention may be put into effect with flat diaphragms 11 or diaphragms 11 that are convex with respect to the wall 12.

Figure 4:
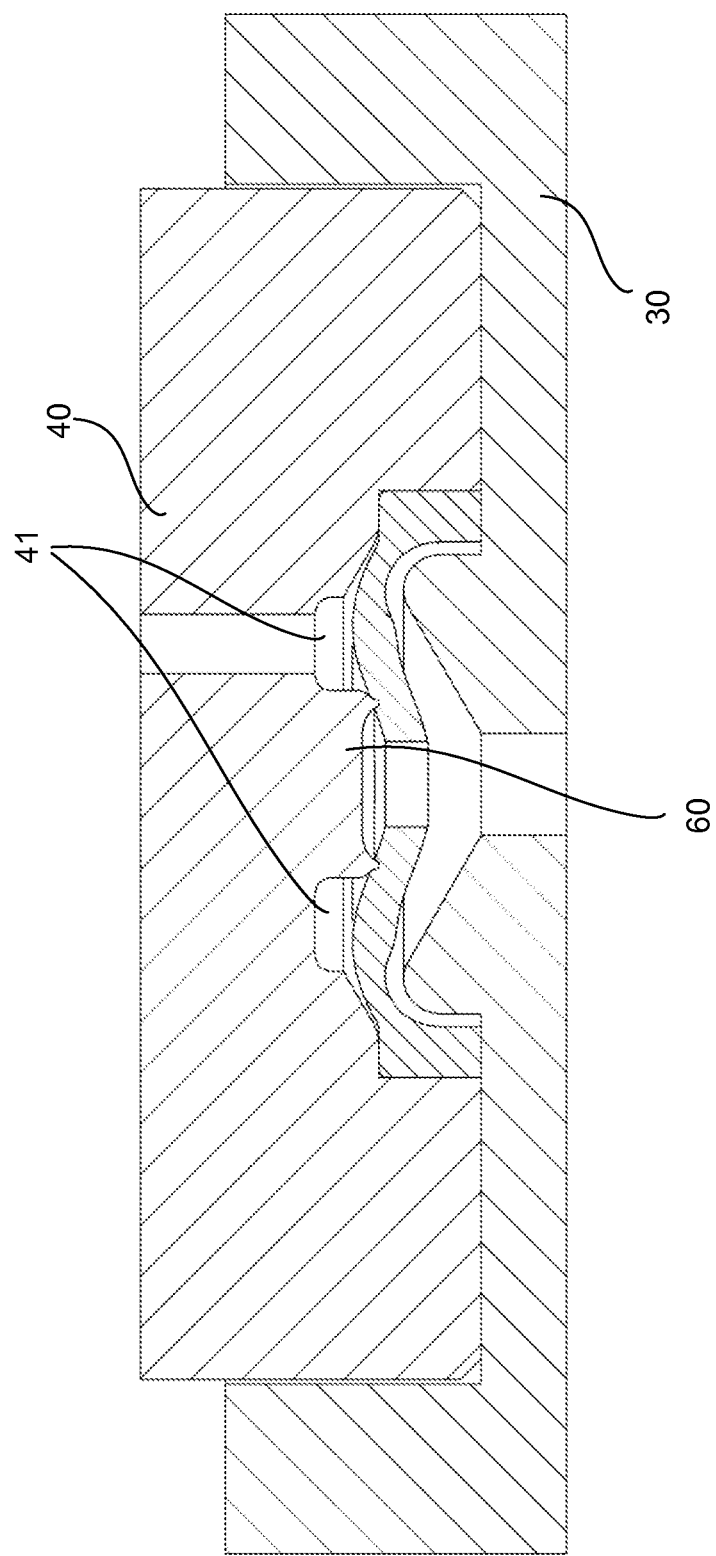
FIG. 4 is cross-section view of the one-way valve member of FIG. 1 arranged within a completed valve in a closed or rest position.

The wall 12 extends from the outer edge of the diaphragm 11 and provides a supporting structure for the diaphragm 11. It also provides a section of the valve member 10 that may be used for positioning and sealing the valve member 10 within a valve chamber. For example, as shown in FIG. 4, the wall 12 may be compressed between sections 30 and 40 of the valve housing, to provide a seal that prevents fluid leaking around the edge of the valve member 10.

The ratio of the wall height to the diaphragm diameter may vary. In some cases, the wall 12 may not be required, for instance because the diaphragm 11 is strong enough to support itself, or due to space saving considerations. In the absence of the wall 12, the valve housing 30,40 may be configured to seal around the edge of the diaphragm 11.

However, the presence of the wall 12 is preferable because it provides a larger surface around which the housing 30,40 may seal and therefore increases the quality of the overall seal and reduces the chance of leakage around the edge of the valve member 10. On the other hand, it is desirable for the height of the valve member 10 to be minimised in some applications, such as lab-on-a-chip applications where space and height are at a premium. In those cases, it is desirable for the wall 12 to not significantly increase the height of the valve member 10 beyond the height required to actuate the valve member. For example, for lab-on-a-chip applications, it is preferable that the overall height of the valve member 10 at rest is 10 mm or less, more preferably 5 mm or less, and more preferably 2 mm or less.

The present invention is applicable to valves of different sizes for different applications, but is particularly applicable to applications such as fluidic manifold or lab-on-a-chip applications where size considerations are important. For fluidic manifold applications, the valve member 10 may have the following dimensions: the outer diameter/maximum width of the valve member 10 is preferably 15 mm or less, more preferably 10 mm or less and sill more preferably 8 mm or less; the diameter/maximum width of the orifice 13 is preferably 4 mm or less, more preferably 2 mm or less and still more preferably 1 mm or less; the maximum thickness of the diaphragm 11 (for example in the relatively thick region around the orifice 13) is preferably 1 mm or less, more preferably 0.75 mm or less and still more preferably 0.5 mm or less; the minimum thickness of the diaphragm 11 (for example in the relatively thin region close to the wall 12 in FIG. 2) is preferably 0.1 mm or more, more preferably 0.2 mm or more; the outer height of the wall 12 is preferably 2.5 mm or less, more preferably 2.0 mm or less and still more preferably 1.5 mm or less. In a preferred embodiment, the valve member 10 has a circular geometry with an outer diameter of 6.9 mm; the diameter of the orifice 13 is 1 mm; the maximum thickness of the diaphragm 11 (in the relatively thick region around the orifice 13) is 0.5 mm; the minimum thickness of the diaphragm 11 (in the relatively thin region close to the wall 12 in FIG. 2) is 0.3 mm; the outer height of the wall 12 is 1.4 mm and the overall height of the valve member 10 at rest is 1.9 mm.

Figure 5:
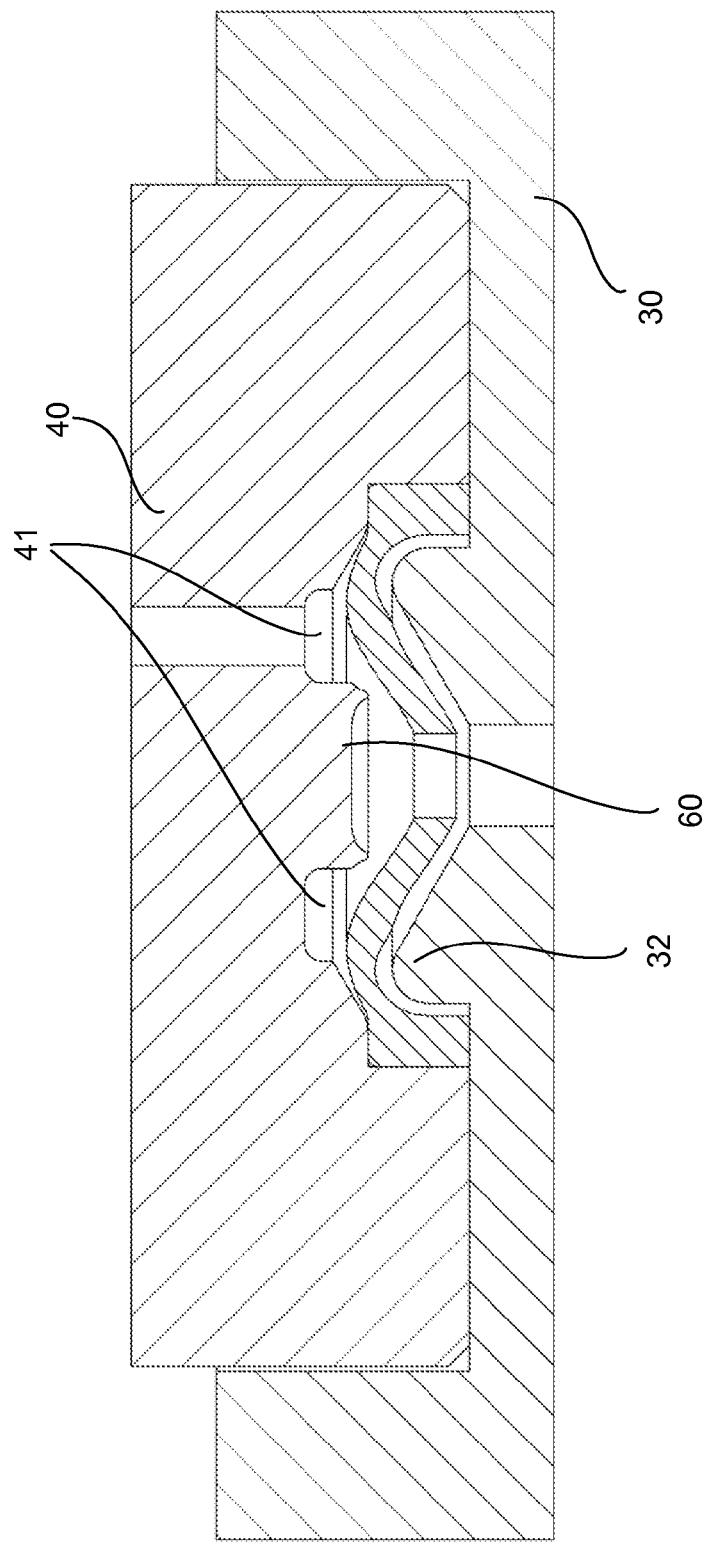
FIG. 5 is cross-section view of the one-way valve member of FIG. 1 arranged within a completed valve in an open position.

FIGS. 3 to 5 show the valve member 10 in situ in a valve.

FIG. 3 shows the valve member 10 in an 'at rest' position, provided over the outlet 31 of a valve chamber. The outlet 31 is provided in a section of valve housing 30. The housing section 30 and the valve member 10 are configured in combination so that the outlet 31 is substantially opposite the centre of the valve member 10. That is, the outlet is provided substantially centrally with respect to the side of the valve chamber. Put another way, the outlet 31 is provided coaxially with the diaphragm orifice 13.

The valve member 10 is provided so that the wall 12 surrounds the outlet 31 and seals against the housing section 30. As shown in FIG. 4, the seal between the housing and the valve member 10 is completed by the provision of the housing section 40 which fits over the top of the valve member 10. Preferably, the wall 12 is compressed between the housing sections 30,40 so as to ensure a good seal. As such, it is preferably that the housing 30,40 is constructed of a substantially rigid plastics material. The housing should be stiff enough so that the valve seat 60 (discussed in more detail below) is not deflected by the valve member.

Preferable plastics materials for the housing include cyclic olefin copolymers (COCs), polymethylpentene (PMP) acrylonitrile butadiene styrene (ABS), poly(methyl methacrylate) (PMMA) and polycarbonate. In general, the housing material is preferably readily moulded, can be joined via plastic welding and is chemically inert. Polycarbonate is particularly preferable because it is readily moulded, exhibits low chemical/plasticiser leaching and fluids flowing through the valve are unlikely to react with it—thereby avoiding contamination of the fluids and also degradation of the valve. In contrast, metals pose an additional risk when the valve is supplying fluid through to a nanopore application due to contamination and/or blocking of the pores, and so are typically not preferred.

In certain applications such as nanopore sequencing where the presence of air bubbles within the fluid can be detrimental to the system, it is desirable to reduce any trapped air within a valve as the fluid is pumped though. Any trapped air could eventually come through the fluid flow at an unwanted time. To reduce this risk the housing section 30 is formed with an integral boss 32 on the output side of the valve. The boss 32 projects into the valve cavity and reduces the dead volume inside the valve. Thus, the boss 32 reduces the volume within the valve in which air bubbles could form. As such, the housing section 30 is shaped to provide a valve chamber large enough for the desired amount of actuation of the valve member 10, but no more. The boss 32 shown in FIG. 2 reduces the volume of the valve chamber by approximately 70% compared to an un-shaped/flat base to the housing section 30. In a fluidic system where two valves are used in series with a positive displacement pump in-between, reducing the amount of air in the system also reduces the output volume inaccuracy caused by the air compressing before the valve opens. The potential for trapped air cannot be removed completely since the valve requires room to move into when opening.

The inlet 41 is also provided in the housing section 41. As such, the outlet 31 and inlet 41 are provided on opposite sides of the diaphragm 11 of the valve member 10. That is, the inlet 41 is provided on a first side of the diaphragm 11, and the outlet 31 is provided on a second side of the diaphragm 11. In FIGS. 4 and 5 the inlet to the valve chamber is provided as a continuous annular ring formed as a depression in the inner surface of the housing member 40. The inlet may be fed by one or more tubes, channels, or pipes passing through the housing section 40 (a single tube passing through housing section 40 is shown in FIGS. 4 and 5). Where multiple tubes are provided it is preferable for them to be arranged in a symmetrical configuration around the annular inlet.

The housing section 40 is also provided with a portion on the inner surface that acts as a valve seat 60. The valve seat 60 is the feature against which the valve member 10 seals to provide the check valve functionality. Advantageously, the housing 30,40 and valve member 10 are configured to cooperate so that, when the valve member 10 is clamped between the housing sections 30,40, the valve member 10 is actively deformed by the valve seat 60 when at rest. That is, the completed valve has a rest configuration in which the diaphragm 11 of the valve member 10 is deformed from the rest configuration of the diaphragm 11 in isolation (i.e. in the absence of the housing 30,40). As can be seen by comparing FIGS. 3 and 4, the valve seat 60 deforms the valve member 10 to depress the centre of the diaphragm 11 around the orifice 13 when the valve is complete, compared to the natural rest position of the valve member 10 in isolation.

As a result, the diaphragm 11 is deformed by the configuration and cooperation of only the diaphragm 11 and the housing 30,40. That is, there are no additional biasing members for biasing the diaphragm 11 against the housing, such as a spring for example. Instead, the valve relies on the elastic nature of the diaphragm 11 to provide an active seal when the valve is at rest. That is, elasticity of the diaphragm creates a force which pushes the diaphragm against the housing to form a seal in the absence of any other forces.

FIG. 5 shows the valve in an open position, in which the diaphragm 11 has been deflected by fluid flowing from the inlet 41 to the outlet 31. When a pressure differential is applied to the valve chamber, to create a larger pressure at the inlet 41 than the outlet 31, the pressure in the inlet 41 provides a force which overcomes the force biasing the diaphragm 11 against the valve seat 60 and hence pushes the diaphragm away from the valve seat 60. As the valve seat 60 and diaphragm 11 separate, a flow path through the orifice 13 is created, allowing fluid flow from the inlet 41 to the outlet 31. As previously discussed, the boss 32 projects into the valve chamber and is shaped to mirror the shape of the diaphragm in the open position, thereby reducing the dead space in the valve and thereby reducing the amount of air that might be collected in the valve. That is, the valve chamber is shaped to have a conical wall around the outlet 41 that projects within the wall 12 of the valve member 10, so as allow space for the diaphragm 11 to move (in order to actuate the valve) whilst reducing the volume of the valve chamber.

When the pressure differential is released and fluid flow through the inlet 41 stops, the diaphragm 11 is free to return to its rest position and seal the valve as in FIG. 4. This effect, compared with conventional valves, is especially noticeable when low fluid speeds of 1 to 0.1 μl/s or less are required, as in the case of making bio-layers for nanopore sensing applications, because such fluid speeds are typically too small to ensure sealing in existing flat check valves which do not provide active sealing (and thus rely on the force provided by the backflow to seal the valve). This affect is further exaggerated in fluidic manifolds where the head pressure is limited due to compact assembly size.

This arrangement, compared to conventional flat check valves, is advantageous because it minimises leakage through the valve. In a conventional flat check valve, the diaphragm is not biased to a closed position at rest. Instead, the valve is actually slightly open, or the valve member 10 lies in an undeformed state next to the valve seat, without being forced against it. In high velocity or pressure systems, this arrangement provides an adequate seal because, as soon as flow attempts to go from the outlet to the inlet, the force on the valve member 10 clamps the seal shut. However, the present invention has identified that in low velocity or low pressure systems there can be significant leakage in the backflow direction before conventional flat check valves seal. This is because the force on the valve member, as backflow begins, is not adequate to prevent leakage of fluid back through the valve.

As such, the existing flat check valves do not adequately perform their function at low pressures. In contrast, the arrangement shown in FIGS. 4 and 5 positively biases the valve member 10 against the valve seat 60 when the valve is at rest. As such, when a backflow condition begins the valve member 10 is already in a sealed position (if starting from rest) or automatically returns itself to the sealed position (if starting from an open position) due to its elastic nature. This occurs even if the pressure of the backflow is small, because the sealing action does not rely upon the fluid pressure to produce an adequate seal.

Advantageously, the seal between the diaphragm 11 and the valve seat 60 is further enhanced by controlling the shape of the contact between the diaphragm 11 and valve seat 60. As can be seen in detail in FIG. 6, the valve seat 60 is provided with a projection 61 that has a height in relief from the rest of the valve seat 60. The projection is preferably annular, forming a ring around the diaphragm orifice 13 when the valve is in a closed position. Preferably, the projection is not substantially larger in diameter than the orifice 13, to allow a large space for the inlet 41 (the advantage of which is discussed in detail below). As such, to avoid dead space within the valve, it is preferable for there to be only a small overlap (i.e. the radial distance from the edge of the orifice to the edge of the projection) of the diaphragm 11 within the projection. Preferably the overlap is less than or equal to twice the height of the projection 61, more preferably less than or equal to once the height of the projection 61.

When the diaphragm 11 contacts the valve seat 60, this projection 61 is the first point of contact with the diaphragm. As such, the elastic force (in the absence of any backpressure) of the diaphragm 11 returning to its rest position is focussed on this projection 61. Because the projection has a relatively small surface area (i.e. in comparison to the whole valve seat 60) the pressure exerted on the diaphragm by the projection 61 is relatively large, causing larger amounts of local deformation (i.e. in contrast to the larger-scale bending and biasing of the diaphragm) and compression in the diaphragm 11. As a result, as can be seen in FIG. 4, the elastomeric diaphragm deforms around the projection 61, and so forms a tight seal.

The projection 61 gives a small seal contact area, concentrating the sealing force, and thereby allows the provision of sealing against fluids of low viscosity without requiring the appliance of a large a large mechanical force to the diaphragm. This helps avoid unnecessarily increasing the break pressure for flow in the correct direction through the valve.

That is, by causing local deformation of the diaphragm 11 around the projection 61, using the force generated by the overall bending and biasing of the diaphragm 11 within the valve chamber, a tight seal can be produced. In contrast, the present invention has identified that the same amount of overall bending and biasing will give a weaker seal if (for example), the shape of the valve seat 60 does not cause any local deformation of the diaphragm 11 (i.e. because the valve seat 60 mirrors the shape of the overall bending and biasing of the diaphragm 11, and does not have projections 61). The quality of the valve seal can be quantified by moving fluid or air against the valve outlet at the very low flow speeds (for example 0.1 µl/s), with the lowest possible pressure differential across the valve, while monitoring any leakage through the valve on the inlet side.

Preferably, to provide a good seal the valve member 10 comprises or consists of silicone, which provides a good balance of rigidity and flexibility. Preferably, the silicone has a hardness of 95 Shore A (as defined in ASTM D2240-00) or less, more preferably 75 Shore A or less, more preferably 50 Shore A or less and still more preferably 40 Shore A or less. The silicone preferably has a hardness of 5 Shore A or more, more preferably 15 Shore A or more, and still more preferably 25 Shore A or more.

Ideally, the projection 61 would come to a point. This would provide the maximum concentration of the sealing force. However, in practice, especially at small scales, it is difficult to achieve a perfect (i.e. v-shaped) point by moulding. As a result, in practice the projection 61 may have a curved point. Nonetheless, it is desirable to maintain the curvature to be as small as possible. This ensures that the maximum amount of local deformation of the diaphragm 11 around the projection 61 for a given geometry of valve. Preferably, especially for small scale applications such as fluidic manifolds or lab-on-a-chip applications, the projection comes to a point with a radius of curvature of 1 mm or less, more preferably of 0.1 mm or less, and even more preferably of 0.05 mm or less. Smaller values of the radius of curvature allow the valve to push against the feature with a lower force to obtain a given amount of local deformation around the projection (i.e. a given seal quality).

Figure 6:
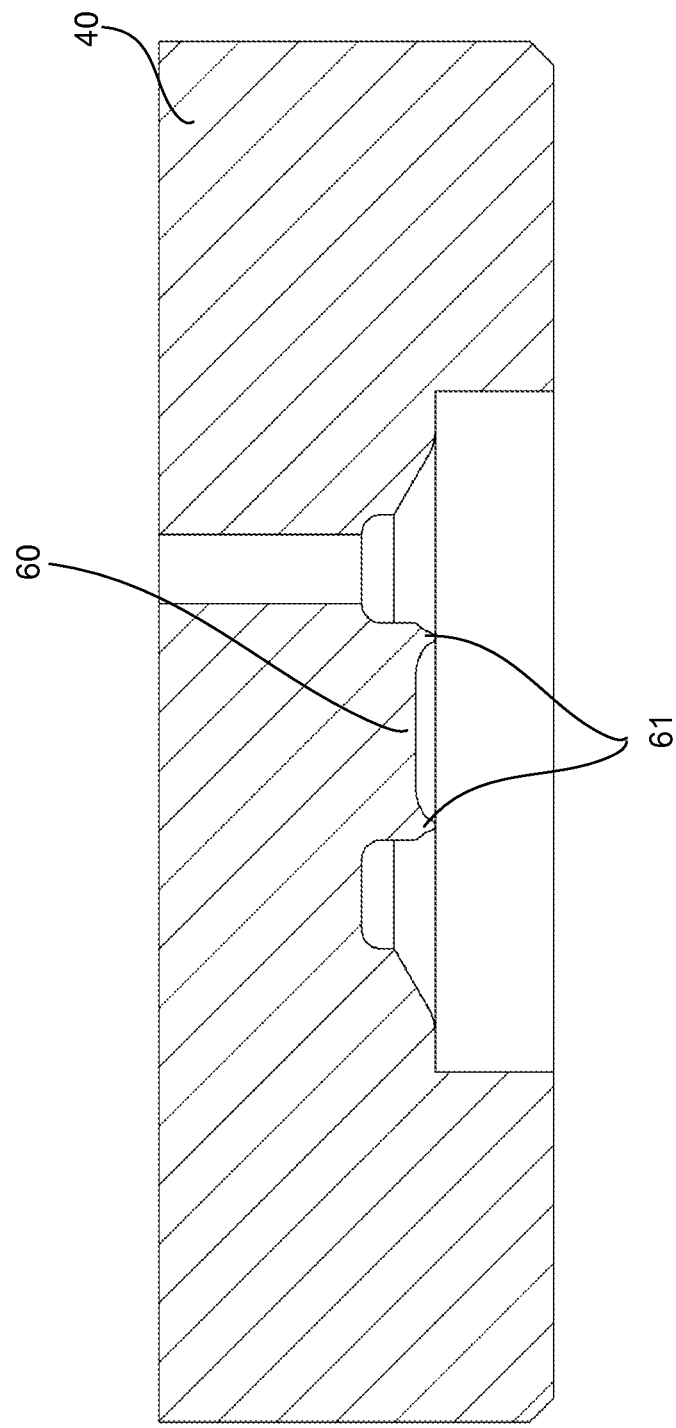
FIG. 6 is a close up view of the upper housing section of the valve of FIG. 5 in isolation.

It has also been found that providing the projection with cross-sectional 'teat' shape, as show in FIG. 6, also assists in the formation of a better seal. The concave shape on the side surface of the projection allows the formation of a projection 61 with a wider base (thereby providing mechanical strength to the projection 61 feature) whilst maintaining a narrow point that causes a large amount of local deformation. In a preferred arrangement, the side surface of the projection 61 has a concave radius of curvature of 0.1 mm or less whilst the projection point has a convex radius of curvature of 0.05 mm or less.

An alternative arrangement to that of FIGS. 1 to 6 is shown in FIGS. 7 to 10.

Figure 7:
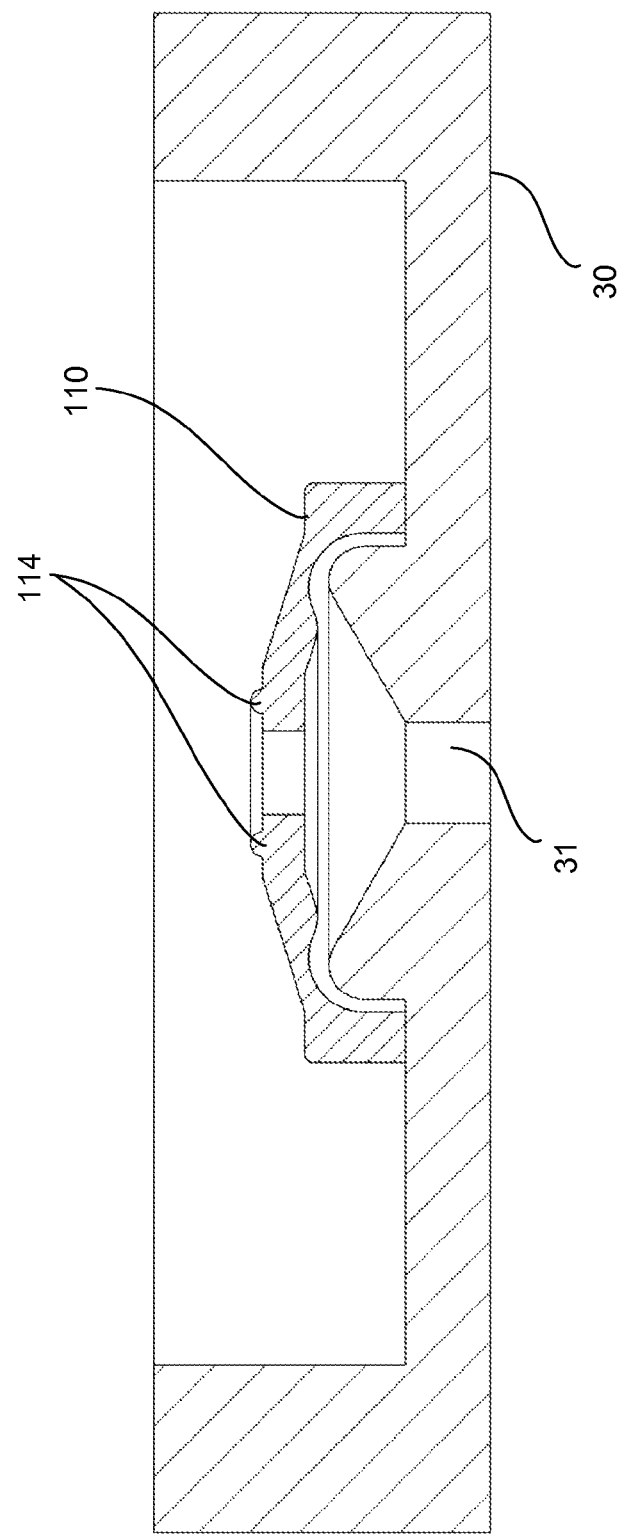
FIG. 7 is cross-section view of an alternative one-way valve member arranged over a valve outlet.
Figure 8:
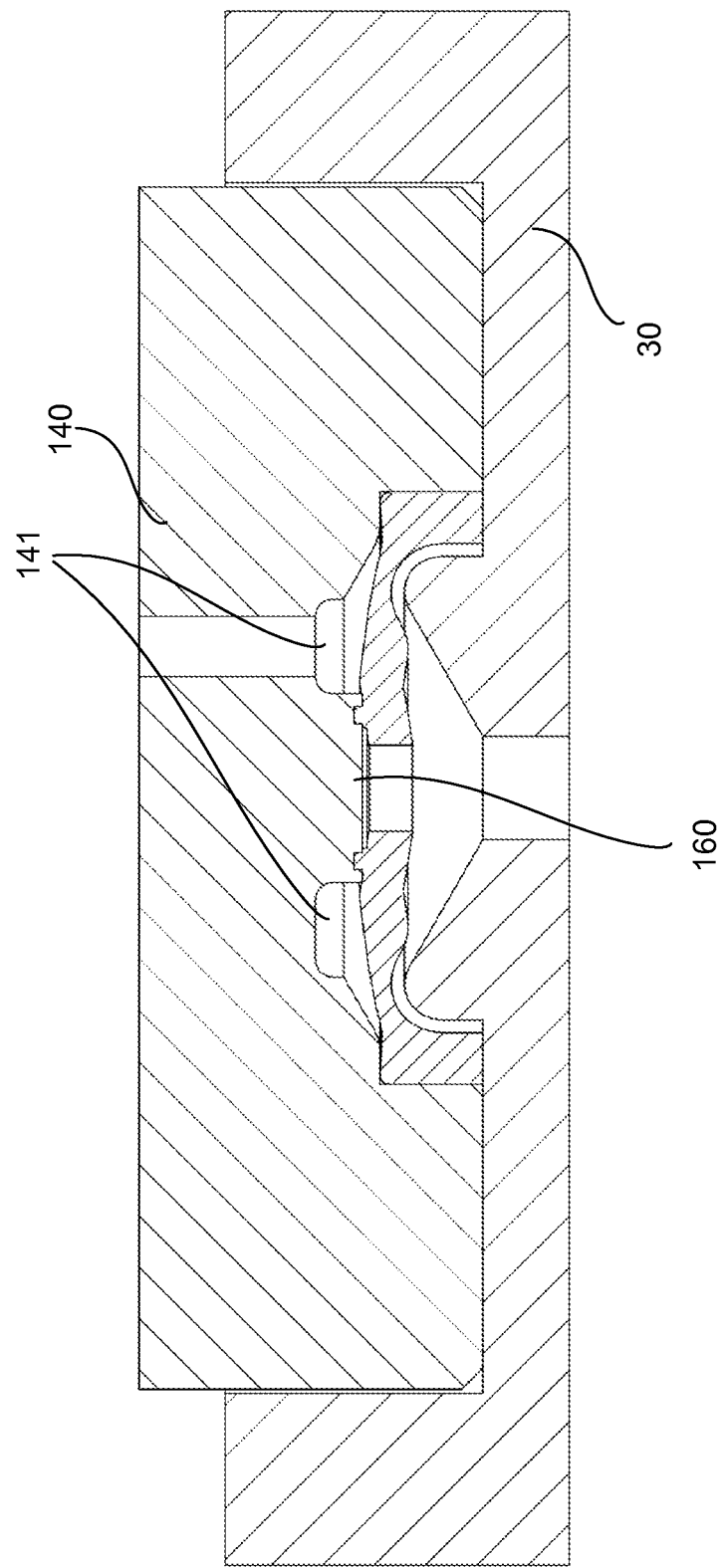
FIG. 8 is cross-section view of the alternative one-way valve member arranged within a completed valve in a closed or rest position.
Figure 9:
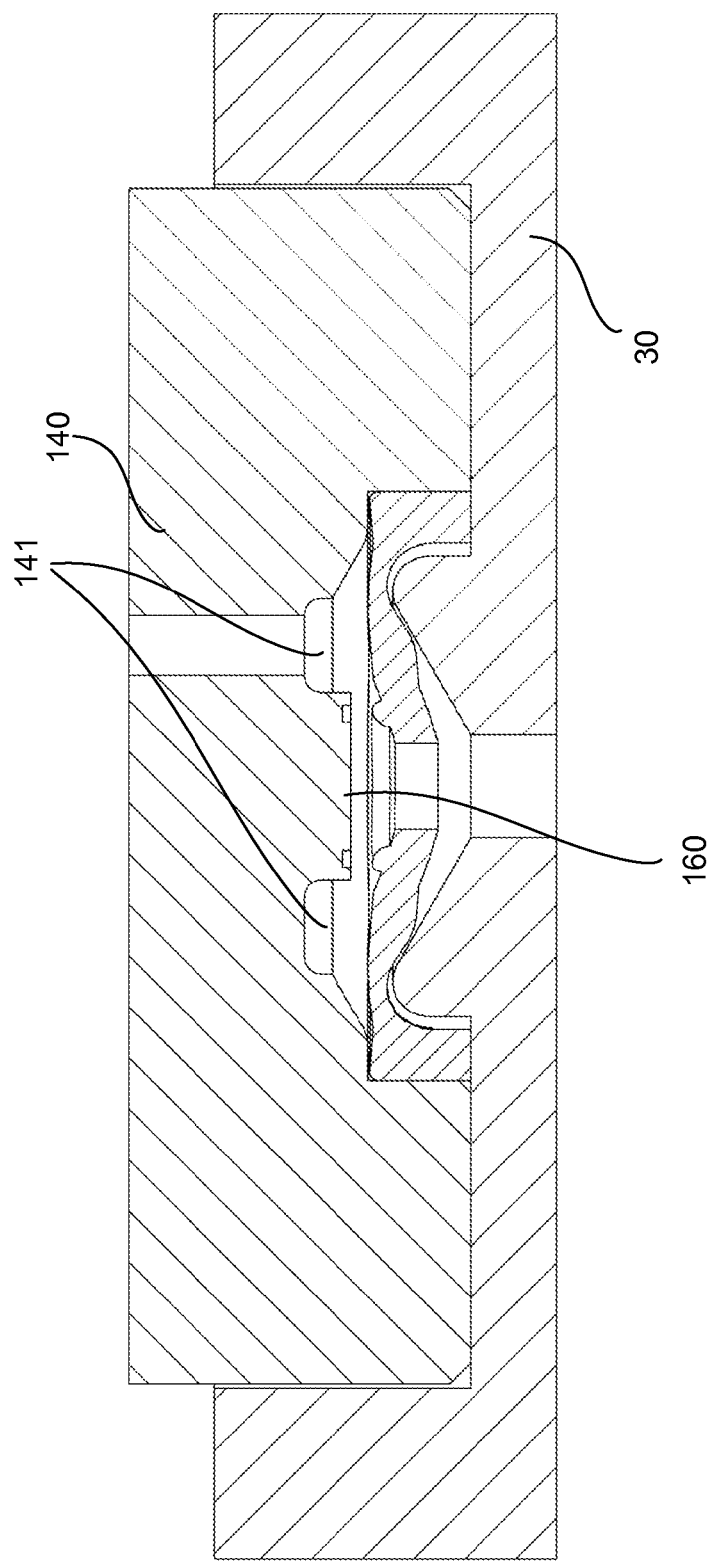
FIG. 9 is cross-section view of the valve of FIG. 8 in an open position.
Figure 10:
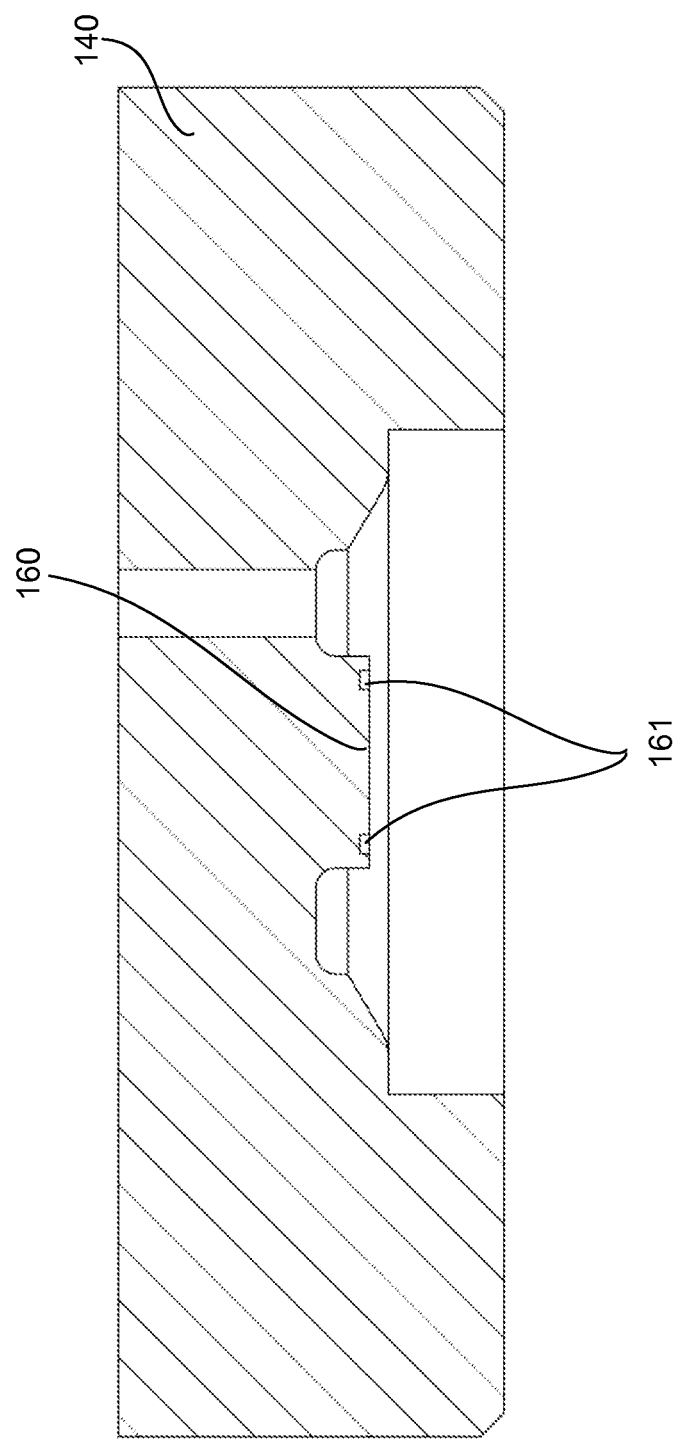
FIG. 10 is a close up view of the upper housing section of the valve of FIG. 9 in isolation.

As can be seen from FIG. 7, the arrangement is very similar to previous arrangement with a valve member 110 provided over the outlet 31 of a housing section 30. In fact, valve member 110 is substantially identical to the valve member 10, but is additionally provided with a raised projection 114 around the orifice 13.

Similarly, the housing section 140, in which the inlet 141 is provided, is substantially identical to the housing section 140 besides the construction of the valve seat 160. As can be seen most clearly in FIG. 10, instead of projections 61, the valve seat 160 is provided with recess an annular recess 161.

Annular recess 161 and raised projection 114 cooperate to provide an enhanced seal in a similar fashion to the projection 61 and valve member 10 of FIGS. 4-10. The raised projection 114 is the first part of the diaphragm 111 that contacts the valve seat 160 at the edges of the recess as the valve closes/returns to its rest position. As such, the initial contact area between the valve member 110 and the valve seat 160 is reduced, compared to a valve member 110 lying flat against a valve seat, for example. As such, the force is concentrated and the local pressure is increased. The recess 161 in the valve seat 160 provides the contact point for the raised projection 114. Because the width of the recess 161 is narrower than the maximum width of the projection 114, the edges of the recess 161 provide the initial contacts with the diaphragm 111. This results in local deformation of the diaphragm around the edges of the recess 161, providing an enhanced seal.

As it will be appreciated, any arrangement of the housing 30,40,140 and diaphragm 10,110 that creates a local deformation of the diaphragm around the orifice, when the valve is at rest, will be advantageous. As such, the invention is not limited to the particular arrangements that have been described as examples.

A potential drawback of the enhanced sealing achieved by configuring the housing and the diaphragm to actively bias the diaphragm and seal the inlet at rest, is that the break pressure of the valve may become increased. As mentioned previously, the break pressure is the minimum fluid pressure required to open the valve in the correct direction (i.e. to allow flow from a designated inlet to a designated outlet).

Whilst it is desirable to create a strong seal to prevent backflow in a one way valve, it is also desirable in certain applications to maintain a low break pressure. An example case is that, when fluid is pumped via a volumetric displacement against the valve, there is a risk of an unknown amount of air being present within the system. This can be problematic when the volume output is required to be accurate. Before the valve opens, any air would compress and create an inaccuracy in volume output. Inaccuracy caused by this effect is reduced by having a lower break pressure, because it reduces the compression of any air that is present, thereby reducing the error in volumetric fluid output introduced by the air. A further advantage of a low break pressure in this scenario is that it avoids the chance of air being dissolved under pressure in the liquid, which in turn minimises the chances of bubbles forming in the liquid when the pressure is released. The presence of bubbles is potentially damaging to the system especially, for example, in a nanopore system. A lower break pressure also advantageously decreases the sealing requirements of other surrounding components in the valve.

The valves of FIGS. 1 to 10 incorporate certain features in order to avoid introducing large break pressures whilst simultaneously providing enhanced sealing.

As has previously been described, the diaphragm 11,111 in each valve has a greater thickness around the orifice than at the perimeter of the diaphragm. This shaping allows for increased overall diaphragm flexibility, because the thinned section makes it easy for the diaphragm 11,111 to flex at the section near the perimeter, but the thicker portion maintains the stiffness in the region contacting the valve seat 60,160. This ensures that, for example, the projection 61 locally deforms the diaphragm 11 and burrows into it, instead of causing an overall deflection of the diaphragm 11.

In contrast, providing a continuously thin diaphragm results in decreased sealing ability, whilst providing a continuously thick diaphragm results in increased break pressure. That is, the diaphragms 11,111 with changing thickness described with reference to FIGS. 1 to 10 provide a balance of sealing ability with break pressure. In one example, changing the shape of the diaphragm from a continuous thickness of around 0.5 mm to incorporate a reduction to a thickness of around 0.3 mm towards the perimeter reduced the measured break pressure, tested at 1 µls flow speed, from 228 mbar to 104 mbar, whilst maintaining a good seal.

Another feature that helps reduce the break pressure is the arrangement of the inlet 41,141 with respect to the diaphragm 11,111. By providing the inlet as an annulus, the area over which the inlet pressure acts is increased, and spread evenly around the diaphragm, when compared to a narrow point inlet. As such, the overall force applied by the fluid entering the valve through the inlet is increased at any given pressure, and a correspondingly lower pressure is required to generate enough force to open the valve. An alternative configuration to the annular arrangement is to have several inlets (i.e. inlets that are not connected as they enter the valve chamber) arranged in an annular configuration. That is, having several inlets that are each radially offset from the centre of the valve chamber, and are each outside the area of the central orifice through the diaphragm. In preferable configurations, the inlet area is up to 50% of the diaphragm within the valve chamber, more preferably up to 55%, and still more preferably up to 60%.

The size and positioning of the inlet area can have a dramatic effect on break pressure. In an experiment using a centrally arranged inlet (with diaphragm apertures provided towards the perimeter, rather than the centre) of comparable diameter to the outlet an inlet pressure of 1 bar was not sufficient to open the valve. In comparison, for the same outlet geometry and corresponding overall valve member size, an annular inlet geometry with a central diaphragm orifice had a break pressure of 104 mbar.

Surprisingly, increasing the size of a centrally arranged inlet is not as effective at reducing the break pressure, because the diameter of the seal around the inlet must also be increased, bringing the seal closer to the perimeter of the diaphragm. This increases the sealing force (because the distance between the perimeter and the orifice is reduced, increasing the force required to produce the same diaphragm deflection, and hence the corresponding break pressure).

Figure 11:
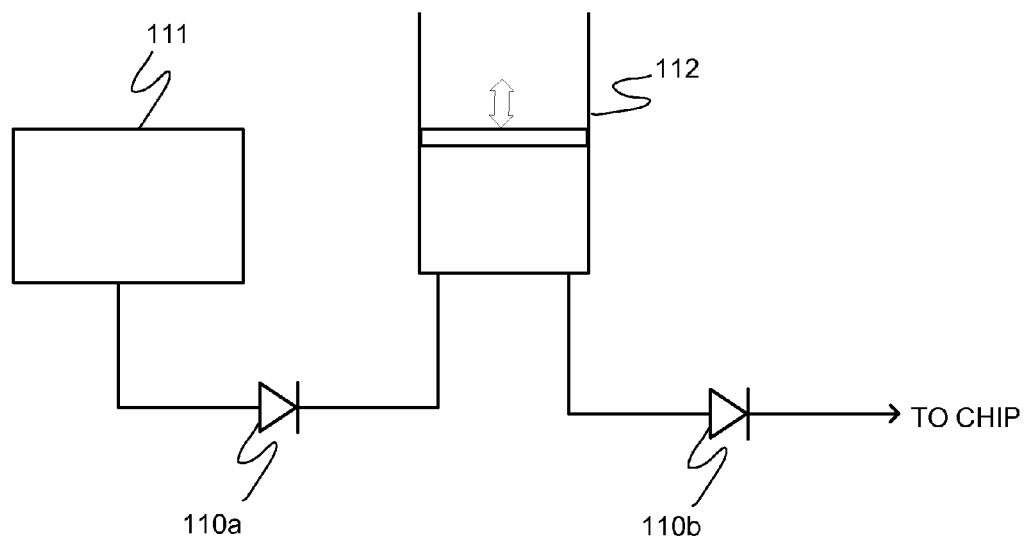
FIG. 11 is a schematic diagram of a system incorporating one-way valves.

FIG. 11 illustrates the operation of an example system utilising the one-way valve member 10. A, a one-way valve 110a (incorporating a one-way valve member 10) is provided in a flow path between a fluid reservoir 111 and a fluid pump 112 in the form of a syringe. Fluid is able to enter the syringe 112 via a fluid inlet. The purpose of the syringe 112 is to supply a volume of fluid to a downstream location, such as chip for performing a bio-analysis, in a controlled and precise manner. Also provided downstream from syringe 112 is a further one way valve 110b. Valve 110b connects the fluid outlet of the syringe 112 to the chip.

In operation, the barrel of the syringe 112 is retracted to pull fluid from the reservoir 111 through one way valve 110a into the syringe 112. Because the syringe 112 also has a fluid outlet, there is the potential that fluid could be drawn from downstream of the outlet. However fluid is prevented from entering the syringe 112 from the outlet due to the presence of one-way valve 110b.

Subsequently, the barrel of the syringe 112 may be advanced to force fluid back out of the syringe 112 via the outlet. The fluid is able to pass through valve 110b to the chip. However, fluid is prevented from flowing through the inlet to the syringe 112 and back to the reservoir 111 due to the presence of the one-way valve 110a preventing fluid flow in that direction.

Figure 12:
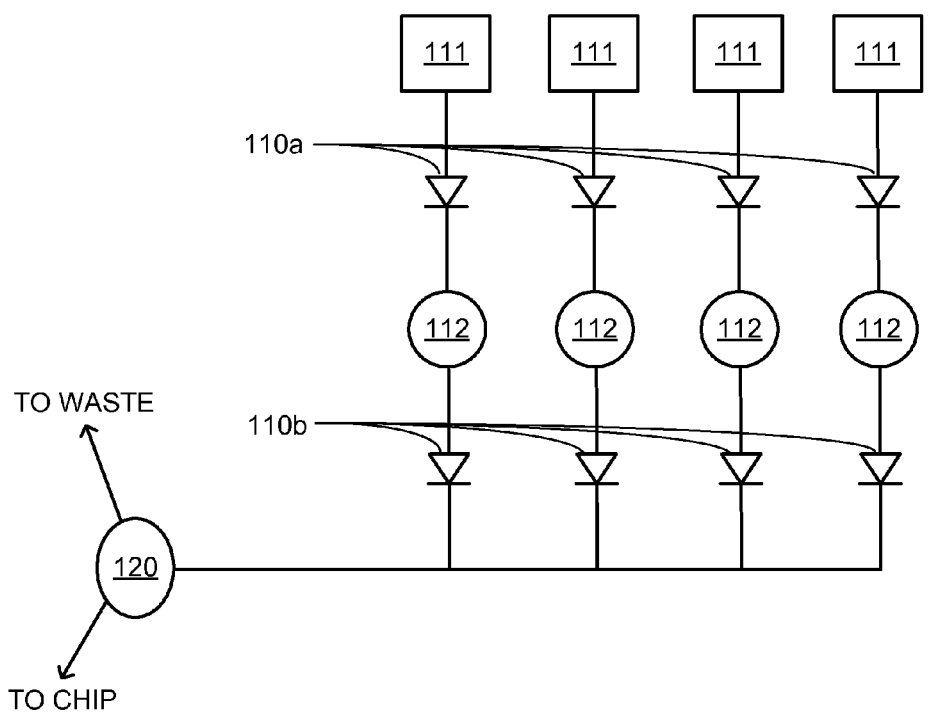
FIG. 12 is a schematic diagram of a more complicated system incorporating one-way valves.
Figure 13B:
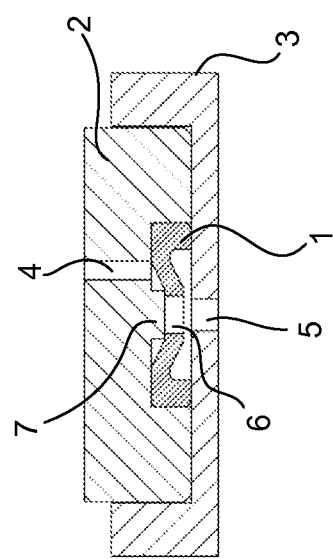
FIG. 13 depicts a prior art valve (a) at rest and (b) in an open position.
Figure 13A:
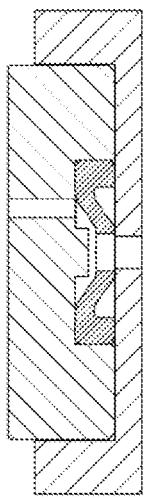

FIG. 12 shows a system incorporating multiple one-way valves 110a, 110b with a plurality of reservoirs 111. Each reservoir 111 is associated with its own respective syringe pump 112, valves 110a, 110b and flow path. The flow paths converge to supply fluid to the chip. Fluid is prevented from flowing between the flow paths of the respective reservoirs due to the one way valves 110a, 110b. Also shown is a two-way valve 120 that allows fluid to be taken to waste.

As such, it becomes apparent how valve of the invention provides an advantageous effect. The valve is able to seal under a back pressure caused, for example, by the operation of the syringe 112—i.e. the back pressure at valve 110b when the barrel of the syringe is being retracted and the back pressure at valve 110a when the barrel is being advanced.

The valve is capable of sealing against backflow over the range of backpressures experienced by the system. The lower limit of back pressure is the head pressure of the liquid in the reservoir 112, which is virtually zero. A typical range of back pressures, for which the valve of the invention is capable of forming a seal, is from between 0-60 mBar and the upper limit is typically about 300 mBar. Of course, the back pressure is dependent upon the flow rate of liquid which is typically between 0.1 uL/s to 200 uL/s in a bio-analysis chip such as that discussed in WO 2012/042226.

The present invention has been described above with reference to specific embodiments. It will be understood that the above description does not limit the present invention, which is defined in the appended claims.

The invention claimed is:

1. A one-way valve, comprising:
    a valve housing;
    a valve member provided within the valve housing, the valve member being operative to open and close the valve and comprising a diaphragm having a central portion and a perimeter portion, wherein the central portion comprises a central orifice to allow fluid to pass from one side of the diaphragm to the other, and the perimeter portion comprises an outer edge of the diaphragm, and wherein the central portion is thicker than the perimeter portion;
    a valve inlet provided on a first side of the diaphragm;
    and a valve outlet provided on a second side of the diaphragm;
    wherein the diaphragm and the valve housing are configured to bias the diaphragm to seal the inlet at rest;
    wherein the housing further comprises a valve seat, on the first side of the diaphragm, against which the diaphragm forms a seal at rest;
    and wherein the diaphragm further comprises a diaphragm projection formed in relief on the first side of the diaphragm, such that a sealing surface of the diaphragm projection contacts the valve seat at rest to form the seal, wherein the valve seat has a recess arranged to cooperate with the diaphragm projection and the width of the recess is narrower than the width of the diaphragm projection.

2. A one-way valve according to claim 1, wherein the valve inlet is annular.

3. A one-way valve according to claim 1, wherein the valve inlet comprises two or more openings, each radially offset from the diaphragm orifice.

4. A one-way valve according to claim 1, wherein the valve outlet is provided coaxially with the diaphragm orifice.

5. A one-way valve according to claim 1, wherein the valve seat biases the diaphragm to seal the inlet at rest.

6. A one-way valve according to claim 1, wherein, at rest, the valve seat causes local compression of the diaphragm on the first side of the diaphragm.

7. A one-way valve according to claim 1, wherein the sealing surface is curved with a radius of curvature in the range of 0.05 mm to 1 mm.

8. A one-way valve according to claim 1, wherein the diaphragm comprises silicone.

9. A one-way valve according to claim 1, wherein the diaphragm comprises a material with a hardness of 95 Shore A or less.

10. A one-way valve according claim 1, wherein the diaphragm of the valve member has a height at rest and prior to deformation in the range of 1.9 mm to 10 mm.

11. A one-way valve according to claim 1, wherein the outer edge of the diaphragm is clamped within the valve housing.

12. A one-way valve according to claim 1, wherein the valve seat further comprises a valve seat projection formed in relief on the valve seat, such that a sealing surface of the valve seat projection contacts the diaphragm at rest to form the seal.

13. A one-way valve according to claim 12, wherein the valve seat projection or the diaphragm projection is formed in an annulus that surrounds the diaphragm orifice.

14. A one-way valve according to claim 12, wherein the radial distance between the edge of the diaphragm orifice and the inner edge of the valve seat projection is less than or equal to twice the height of the valve seat projection.

15. A one-way valve according to claim 12, wherein the valve seat projection is formed in an annulus that surrounds the diaphragm orifice.

16. A one-way valve according to claim 1, wherein the radial distance between the edge of the diaphragm orifice and the inner edge of the diaphragm projection is less than or equal to twice the height of the diaphragm projection.

17. A one-way valve according to claim 1, wherein the diaphragm projection is formed in an annulus that surrounds the diaphragm orifice.

18. A method of operating a valve having a valve seat, on a first side of a diaphragm, against which valve seat the diaphragm forms a seal at rest,
wherein the diaphragm further comprises a diaphragm projection formed in relief on the first side of the diaphragm, such that a sealing surface of the diaphragm projection contacts the valve seat at rest to form the seal, and wherein the valve seat has a recess arranged to cooperate with the diaphragm projection and the width of the recess is narrower than the width of the diaphragm projection,
the method comprising:
arranging the diaphragm in a valve housing, so that the diaphragm and the housing bias the diaphragm to seal an inlet to the valve chamber, when there is no pressure differential across the diaphragm, wherein the diaphragm has a central portion and a perimeter portion, wherein the central portion comprises a central orifice, and the perimeter portion comprises an outer edge of the diaphragm, and wherein the central portion is thicker than the perimeter portion; and creating a pressure differential across the valve chamber, wherein the pressure at the inlet is greater than the pressure in the valve chamber, and wherein the pressure deforms the diaphragm to unseal the inlet.

19. A method of operating a valve according to claim 18, further comprising returning the diaphragm to the sealed position by removing the pressure differential across the valve chamber.

20. A method of operating a valve according to claim 18, wherein the valve seat further comprises a valve seat projection formed in relief on the valve seat, such that a sealing surface of the valve seat projection contacts the diaphragm at rest to form the seal.

21. A one-way valve, comprising:
a valve housing;
a valve member provided within the valve housing, the valve member being operative to open and close the valve and comprising a diaphragm having a central portion and a perimeter portion, wherein the central portion comprises a central orifice to allow fluid to pass from one side of the diaphragm to the other, and the perimeter portion comprises an outer edge of the diaphragm, and wherein the central portion is thicker than the perimeter portion;
a valve inlet provided on a first side of the diaphragm; and
a valve outlet provided on a second side of the diaphragm;
wherein the diaphragm and the valve housing are configured to bias the diaphragm to seal the inlet at rest;
wherein the housing further comprises a valve seat, on the first side of the diaphragm, against which the diaphragm forms a seal at rest;
wherein:
the valve seat further comprises a valve seat projection formed in relief on the valve seat, such that a sealing surface of the valve seat projection contacts the diaphragm at rest to form the seal, and/or
the diaphragm further comprises a diaphragm projection formed in relief on the first side of the diaphragm, such that a sealing surface of the diaphragm projection contacts the valve seat at rest to form the seal, wherein the valve seat has a recess arranged to cooperate with the diaphragm projection and the width of the recess is narrower than the width of the diaphragm projection;
wherein the diaphragm is connected at its perimeter portion to a supporting wall; and
wherein the diaphragm has a domed shape that is concave relative to the supporting wall, where the domed shape is convex relative to the valve seat.

* * * * *